US006801239B2

(12) United States Patent
Nakahata

(10) Patent No.: US 6,801,239 B2
(45) Date of Patent: Oct. 5, 2004

(54) IMAGE FORMING APPARATUS

(75) Inventor: Hiroshi Nakahata, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/464,476

(22) Filed: Jun. 19, 2003

(65) Prior Publication Data

US 2003/0234857 A1 Dec. 25, 2003

(30) Foreign Application Priority Data

Jun. 20, 2002 (JP) ........................................ 2002-179284

(51) Int. Cl.[7] .............................................. G02B 26/08
(52) U.S. Cl. ...................... 347/243; 347/259; 347/260
(58) Field of Search ................................ 347/241, 243, 347/259, 260, 261; 359/216, 217, 204, 206

(56) References Cited

U.S. PATENT DOCUMENTS 6,636,340 B1 * 10/2003 Hama et al. ................. 359/204
6,642,951 B2 * 11/2003 Tanaka ....................... 347/241

FOREIGN PATENT DOCUMENTS

JP  2001-33720  2/2001
JP  2002-98922  4/2002

* cited by examiner

Primary Examiner—Huan Tran
(74) Attorney, Agent, or Firm—Fitzpatrick, Cella, Harper & Scinto

(57) ABSTRACT

An image forming apparatus includes a deflection unit for deflection scanning a first and a second laser beam, a first photosensitive member being exposed by the first laser beam deflection, and a second photosensitive member being disposed at a location more distant from the deflection unit than the first photosensitive member, the second photosensitive member being exposed by the second laser beam. A first reflection member reflects the first laser beam deflection scanned by the deflection unit in a direction away from the first photosensitive member. A second reflection member reflects the first laser beam reflected by the first reflection member toward the first photosensitive member. The first reflection member is disposed nearer to the first photosensitive member than the second laser beam projected from the deflection unit, whereas the second reflection member is disposed remoter from the first photosensitive member than the second laser beam projected from the deflection unit.

9 Claims, 7 Drawing Sheets

IMAGE FORMING APPARATUS

This application claims the right of priority under 35 U.S.C. § 119 based on Japanese Patent Application No.JP2002-179284 which is hereby incorporated by reference herein in its entirety as if fully set forth herein.

BACKGROUND OF THE INVENTION

1. Field of the Invention

The present invention relates to an image forming apparatus such as a copying machine, a printer, etc., using an electrophotographic method, and more particularly, it relates to such an image forming apparatus having a plurality of photosensitive members.

2. Description of the Related Art

FIGS. 5 through 7 show one example of an image forming apparatus of the so-called tandem type having a plurality of photosensitive members.

FIG. 5 is an image forming apparatus for printing color images, which has independent image bearing members (hereinafter referred to as photosensitive drums) for colors of yellow, magenta, cyanogen and black, respectively.

Each photosensitive drum is formed of a conductor with a photosensitive layer coated thereon, and serves to form an electrostatic latent image thereon with a laser beam projected from a scanning optical unit.

A scanning optical unit 21 irradiates laser beams to the photosensitive drums based on the image information sent by an unillustrated image reading device, a personal computer, etc. A plurality of development units 22 serve to form toner images on the corresponding photosensitive drums, respectively, with a toner which is friction electrified or charged. An intermediate transfer belt 23 conveys the toner images on the photosensitive drums to a sheet of transfer paper. A sheet cassette 24 stores a multitude of sheets of transfer paper on which toner images are to be formed. A fixing unit 25 serves to make the toner images thus transferred onto the transfer sheet to be adsorbed to the transfer sheet through application of heat. A discharge tray 26 serves to receive the image-fixed transfer sheet discharged thereto. A plurality of cleaners 27 clean or remove the toner remaining on the corresponding photosensitive drums, respectively.

The formation of images is performed in such a manner that electrostatic latent images are formed on the photosensitive drums electrically charged by corresponding chargers by irradiating laser beams emitted based on the image information from the scanning optical unit 21 onto the photosensitive drums, respectively. Thereafter, toner images are formed on the photosensitive drums, respectively, by attaching the toner friction electrified or charged in the development unit 22 to the electrostatic latent images.

The toner images are then transferred from the photosensitive drums onto the intermediate transfer belt 23. By retransferring the toner images to a transfer sheet conveyed from the sheet cassette 24 arranged at a lower portion of the main body of the apparatus, an image is formed on the transfer sheet.

The toner of the image transferred onto the transfer sheet is fixed by means of the fixing unit 25, and the transfer sheet is then discharged and loaded onto the discharge tray 26.

FIG. 6 shows an image forming unit of FIG. 5. Since the image forming unit is bilaterally symmetrical, symbols in this figure are attached on one side alone, in this figure the scanning optical unit 21 forms electrostatic latent images on the photosensitive drums, respectively, by means of laser beams which pass through a rotary polygon mirror in the form of a polygon mirror 28, which acts to perform deflection scanning of the laser beams emitted based on image information, through imaging elements in the form of fθ lenses 29, 30 for forming or focusing spot images on the photosensitive drums while scanning the laser beams at a uniform speed, through a plurality of reflection members in the form of return mirrors 31a–31d, which reflect the laser beams in prescribed directions, respectively, and through a dustproof glass 32 for protecting the scanning optical unit 21 from dust.

Unlike a conventional scanning optical system in which laser beams are irradiated onto photosensitive drums from locations away therefrom, the scanning optical unit 21 is now coming to be arranged at a position near the photosensitive drums in accordance with the main body of the image forming apparatus being made compact. Thus, a system is adopted in which one polygon motor unit is used to irradiate a plurality of (e.g., four) photosensitive drums, as shown in FIG. 6, with two scanning groups being provided for irradiating a plurality of laser beams to opposed sides of the polygon mirror 28.

In addition, a plurality of return mirrors are used to serve the purpose of achieving the compactification of the scanning optical unit. There is also used a mold lens which is composed of two lenses stuck together or which is molded integrally with two optical paths, so that laser beams with two different optical paths are caused to form or focus images on the photosensitive drums, respectively.

In the parallel optical system in which a plurality of laser beams are scanned in parallel with one another from this polygon mirror 28, a deflection surface or place is required for each of the optical paths, and hence a thick polygon mirror or a polygon mirror of a two stage configuration has to be employed.

In contrast to the above-mentioned optical system using the thick or two stage polygon mirror, however, there is another optical system using a thin polygon mirror 33, as shown in FIG. 7, which is capable of reducing the thickness of the entire optical system.

In this system, respective laser beams are made to enter and exit the polygon mirror at different angles, respectively, and the laser beams to be irradiated to the respective photosensitive drums are separated from each other at a location at which a predetermined interval between the laser beams is obtained.

The laser beams, after having been deflection scanned by means of the polygon mirror 33, pass through common fθ lenses 35, 36, and then proceed by way of two return mirrors 34a, 34c as well as one concave mirror 34b, or by way of two return mirrors 34d, 34f as well as one concave mirror 34e, so that they are irradiated to the photosensitive drums, respectively.

Moreover, with such a laser beam separation configuration, one of the laser beams, being deflection scanned at a lower side of FIG. 7, is reflected in an upward direction in this figure by the return mirror 34d disposed in an optical path toward an inner photosensitive drum, in such a manner that it crosses the other laser beam which is being deflection scanned at an upper side of FIG. 7. Thereafter, the one laser beam is reflected and irradiated to the inner photosensitive drum by means of the plurality of return mirrors 34e, 34f disposed at an upper portion of an optical casing.

In the case of the oblique incidence optical system of FIG. 7, assuming that the fθ lenses have refractive power in the main scanning direction, the same operation as in the case of parallel optical system of FIG. 6 is performed. Therefore, the oblique incidence optical system can be arranged just like the parallel optical system of FIG. 6, but with respect to the sub-scanning direction, laser beams enter the fθ lenses obliquely or at angles relative to the optical axes of the fθ lenses, and hence it is fundamentally difficult for the oblique incidence optical system to ensure the performance of converging or focusing laser beams on the photosensitive drums. Thus, the concave mirrors 34b, 34e are inevitably added for converging the laser beams into the sub-scanning direction after separation of the respective laser beams. (Also, even when a third focusing lens with refractive power in the sub-scanning direction is added instead of these concave mirrors, a similar operation is performed.)

On the other hand, in the case of the oblique incidence optical system of FIG. 7, it is necessary to arrange a total of four imaging optical elements in one scanning group at locations after the polygon mirror. Thus, for another or second oblique incidence optical system with a reduced number of optical elements, a proposal has been made that the second imaging lens of the two fθ lenses is arranged for each laser beam at a location after separation of the laser beams.

Such an arrangement requires one second imaging lens for each of the laser beams, but does not need a concave mirror or third imaging lens, and hence a laser beam can be converged or focused onto a photosensitive drum by the use of three imaging optical elements. As a result, it is possible to obtain an apparatus without requiring an arrangement space for third imaging optical elements in comparison with the oblique incidence optical system using a concave mirror or third imaging lens for each laser beam as shown in FIG. 7.

However, the aforementioned optical system as shown in FIG. 6 has the following problems. That is, since the imaging optical elements are arranged before separation of the laser beams so as to reflect the laser beams to the photosensitive drum side, it is necessary to provide a space for arrangement of an increased number of return mirrors within the scanning optical unit, thus resulting in the enlarged size of the apparatus as a whole.

In addition, the aforementioned oblique incidence optical system as shown in FIG. 7 has the following problems. That is, in such an oblique incidence optical system, laser beams enter the fθ lenses 35, 36 in their states (i.e., axes of the beams) inclined in the subscanning direction. Therefore, it is necessary to provide concave mirrors or third imaging lenses for imaging or focusing laser beams in the sub-scanning direction after separation thereof as well as a space for arrangement of a plurality of return mirrors and lenses for reflecting the laser beams in directions toward the photosensitive drums, thereby enlarging the entire size of the apparatus.

Furthermore, even in the construction of the aforementioned second oblique incidence optical system with a reduced number of optical elements in which the second imaging lenses in the form of fθ lenses are arranged for laser beams, respectively, after separation thereof, the second imaging lenses are arranged without consideration of other optical elements such as mirrors, thus resulting in an enlargement of the scanning optical unit.

SUMMARY OF THE INVENTION

An object of the present invention is to provide an image forming apparatus with a scanning optical unit reduced in size.

Another object of the present invention is to provide an image forming apparatus in which those of a plurality of laser beams which lie at a photosensitive member side are each directed away from photosensitive members in such a manner as to cross another laser beam, and are thereafter irradiated to the photosensitive members, respectively.

A further object of the present invention is to provide an image forming apparatus which comprises: a first laser beam and a second laser beam; a deflection unit for deflection scanning the first and second laser beams; a first photosensitive member being exposed by the first laser beam deflection scanned by the deflection unit; a second photosensitive member being disposed at a location more distant from the deflection unit than the first photosensitive member, the second photosensitive member being exposed by the second laser beam deflection scanned by the deflection unit; a first reflection member for reflecting the first laser beam deflection scanned by the deflection unit in a direction away from the first photosensitive member; and a second reflection member for reflecting the first laser beam reflected by the first reflection member in a direction toward the first photosensitive member. The first reflection member is disposed at a location nearer to the first photosensitive member than the second laser beam projected from the deflection unit, whereas the second reflection member is disposed at a location remoter from the first photosensitive member than the second laser beam projected from the deflection unit.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described below in detail while referring to the accompanying drawings. However, it is to be understood that the measurements, materials, configurations, relative arrangements and the like of component parts described in the following embodiments are only illustrative but should not be construed as limiting the range of legal protection for the present invention in any manner, in particular unless specified otherwise.

First Embodiment

In the first place, reference will be made to a first embodiment of the present invention while referring to FIG.

Figure 1:
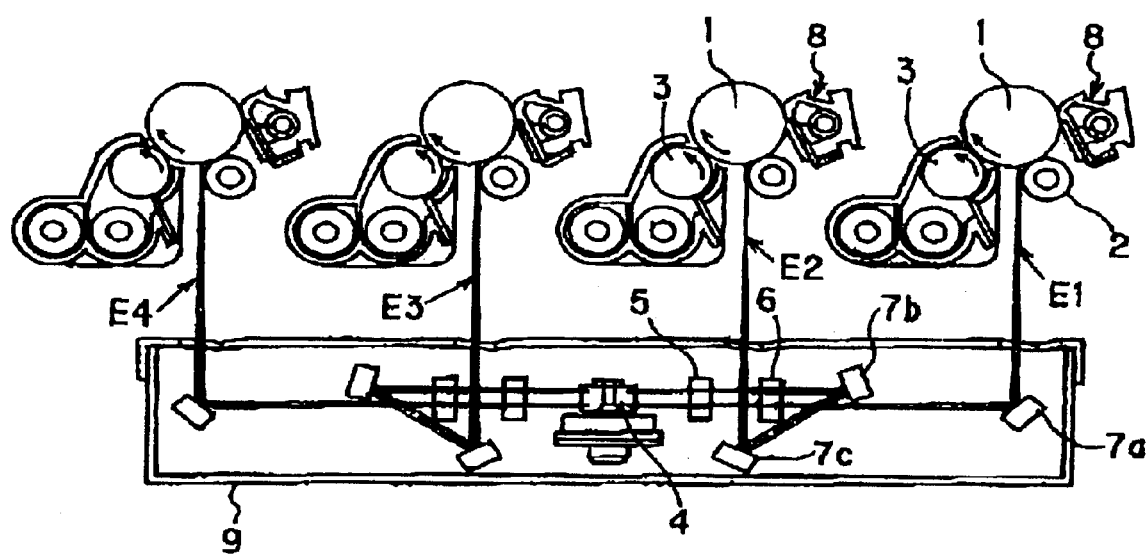
FIG. 1 is a schematic cross sectional view showing a scanning optical unit with its associated parts according to a first embodiment of the present invention.

1. FIG. 1 schematically shows a scanning optical unit and an image forming unit such as photosensitive drums and the like, which are related to the first embodiment of the present invention.

In the first embodiment, the scanning optical unit is arranged at a location under a plurality of (e.g. four in the illustrated example) photosensitive members in the form of photosensitive drums 1. The scanning optical unit as used in this embodiment is such a system in which four laser beams enter one deflection unit in the form of a polygon mirror 4 from its opposite sides, that is, two pairs of two laser beams enter the opposite sides of the polygon mirror 4, respectively, so that the photosensitive drums 1 are exposed by four beams of irradiation light E1–E4, respectively, reflectively deflected from the polygon mirror 4.

In FIG. 1, outer ones of the plurality of photosensitive drums 1 are disposed at locations more distant from the polygon mirror 4 than inner photosensitive drums, and each of the photosensitive drums 1 is composed of a conductor coated with a photosensitive layer. In addition, two of the photosensitive drums 1 are disposed at one side of the polygon mirror 4, whereas the other two photosensitive drums 1 are disposed at the opposite side of the polygon mirror 4. A plurality of chargers 2 are provided one for each photosensitive drum 1 at locations adjacent thereto for electrifying or charging the corresponding photosensitive drums 1 at a predetermined voltage thereby to form electrostatic latent images on the surfaces thereof. A plurality of development units 3 are also provided one for each photosensitive drum 1 at locations adjacent thereto for supplying a toner to the electrostatic latent images on the corresponding photosensitive drums 1 thereby to form toner images.

The polygon mirror 4, which forms a rotary polygon mirror of the present invention serves to perform deflection scanning of the laser beams supplied thereto.

Imaging elements in the form of first and second fθ lenses 5, 6 serve to focus the laser beams scanned at a uniform speed onto the photosensitive drums 1 so as to form spot images thereon. In this embodiment, the first fθ lenses 5 each comprises a cylindrical lens, and the formation of images in a sub-scanning direction (perpendicular to a main scanning direction) is performed by means of the second fθ lenses 6 alone.

A plurality of reflection members in the form of return mirrors 7a–7c reflect laser beams in prescribed directions, respectively. Here, note that a first return mirror 7b is disposed at a location nearer to a corresponding inner photosensitive drum 1 than a second laser beam (a lower laser beam in FIG. 1) projected from the polygon mirror 4, whereas a second return mirror 7c is disposed at a location remoter from the corresponding photosensitive drum 1 than the second laser beam projected from the polygon mirror 4.

A plurality of cleaners a provided one for each photosensitive drum 1 at locations adjacent thereto serve to clean the toner remaining on the corresponding photosensitive drums 1. An optical casing 9 receives respective optical components of the scanning optical unit.

In the optical arrangement of the scanning optical unit according to this embodiment, the polygon mirror 4 is arranged in the center of the optical casing 9, and a plurality of optical paths extending from the polygon mirror 4 to the respective photosensitive drums 1 are arranged in bilateral symmetry, as clearly shown in FIG. 1. Therefore, only two of four scanning groups for beams of irradiation light E1, E2 at one side of the polygon mirror 4 will be explained herein.

Here, note that a plurality of (e.g., four in the illustrated embodiment) laser beams are generated or emitted from a plurality of unillustrated laser units which are arranged vertically in parallel with respect to one another in the optical casing 9. The laser beams emitted from the laser units to the polygon mirror 4 are deflection scanned on the photosensitive drums 1 by being reflected by each deflection facet of the integral-type two-stage polygon mirror 4, which has its deflection facets arranged in two stages in the vertical direction from the bottom of the optical casing 9. The facial directions (i.e., directions of planes) of the upper and lower deflection facets of the two-stage polygon mirror 4 are in coincidence with each other.

The synchronization of respective scanning lines on the photosensitive drums 1 in the main scanning direction is performed by detecting the respective laser beams by means of unillustrated BD sensors and matching the image end portions with one another, so that the laser beams projected from the polygon mirror 4 pass through the fθ lenses 5, 6 so as to be imaged or focused on the photosensitive drums 1.

Here, note that each of the second fθ lenses 6 is composed of two lenses combined with each other so as to accommodate the optical axes of the respective laser beams.

Of the laser beams having passed through one second fθ lens 6, one laser beam deflection scanned by the upper deflection facets of the polygon mirror 4 near the side of the photosensitive drums 1 is returned or reflected in a downward direction by the beam-separation return mirror 7b disposed in the corresponding light path. Then, the laser beam separated and reflected downward by the beam-separation return mirror 7b passes right under the second fθ lens 6, whereafter it is reflected again by the return mirror 7c disposed on the lower or bottom surface of the optical casing 9, so that it is finally irradiated on a corresponding photosensitive drum 1 while passing between the first and second fθ lenses 5, 6.

In addition, the other or lower one of the laser beams, lying away from the side of the photosensitive drums 1 (i.e., deflection scanned by the lower deflection facets of the polygon mirror 4), passes right under the beam-separation return mirror 7b and is then reflected to be irradiated on a corresponding photosensitive drum 1 by means of the return mirror 7a disposed at one end of the optical casing 9.

Here, it is to be noted that the vertical interval between the respective laser beams has a sufficient distance capable of separating the laser beams from each other after projection of laser beams from the polygon mirror 4, and that the return mirrors 7a–7c, are arranged in such a manner that the two vertically separated beams are not subjected to vignetting of their luminous fluxes due to the tolerances of individual component parts, the face inclination of the polygon mirror 4 and the like.

As shown in the above-mentioned arrangement, the laser beam lying near or at the side of the photosensitive drums 1 is first reflected downwardly, i.e., in a direction away from the photosensitive drums 1, by means of the return mirror 7b, and then reflectively irradiated on the photosensitive drums 1 by means of the return mirror 7c, as a result of which it is possible to reduce the longitudinal length of the return mirror 7b, and it is also possible to arrange the individual optical component parts in a vertically dense manner, whereby the scanning optical unit can be made compact in overall size and slim in thickness.

Second Embodiment

Figure 2:
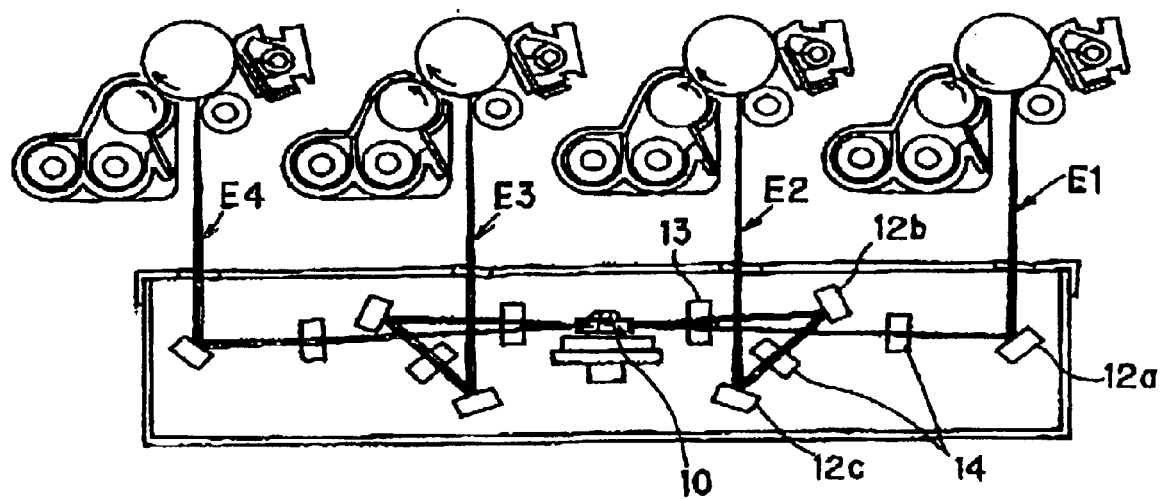
FIG. 2 is a schematic cross sectional view showing a scanning optical unit with its associated parts according to a second embodiment of the present invention.
Figure 3A:
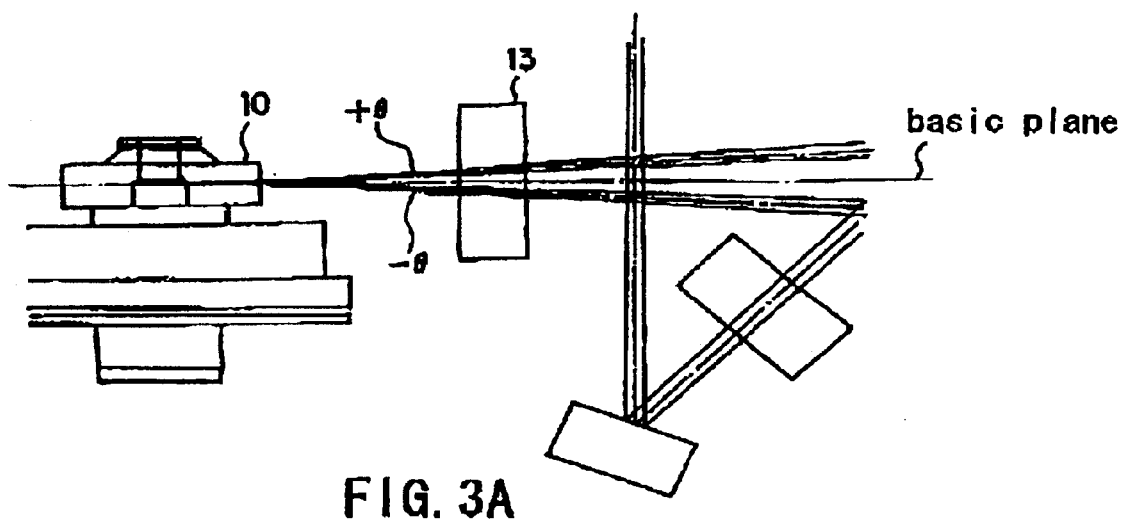
FIGS. 3A and 3B are views showing the different states of laser beams emitted from a polygon mirror according to the second embodiment of the present invention.
Figure 3B:
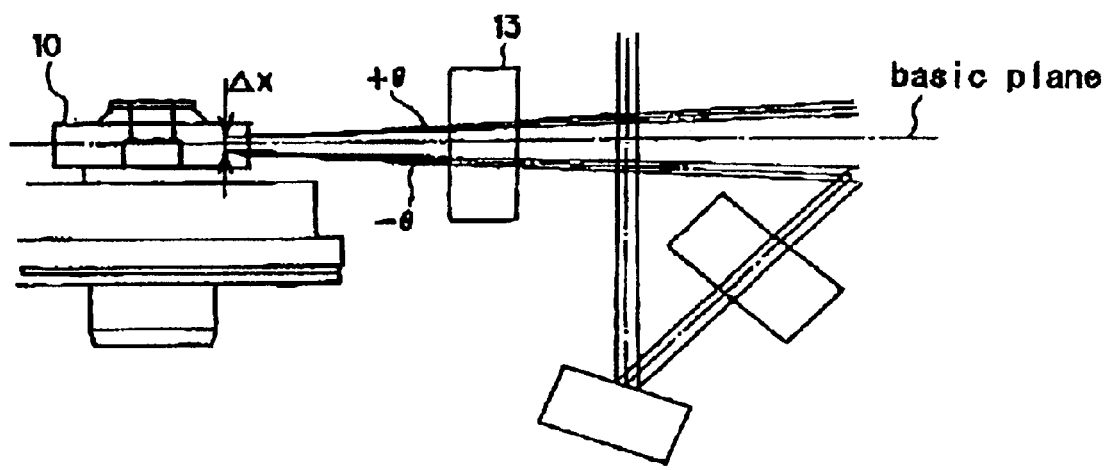
Figure 4:
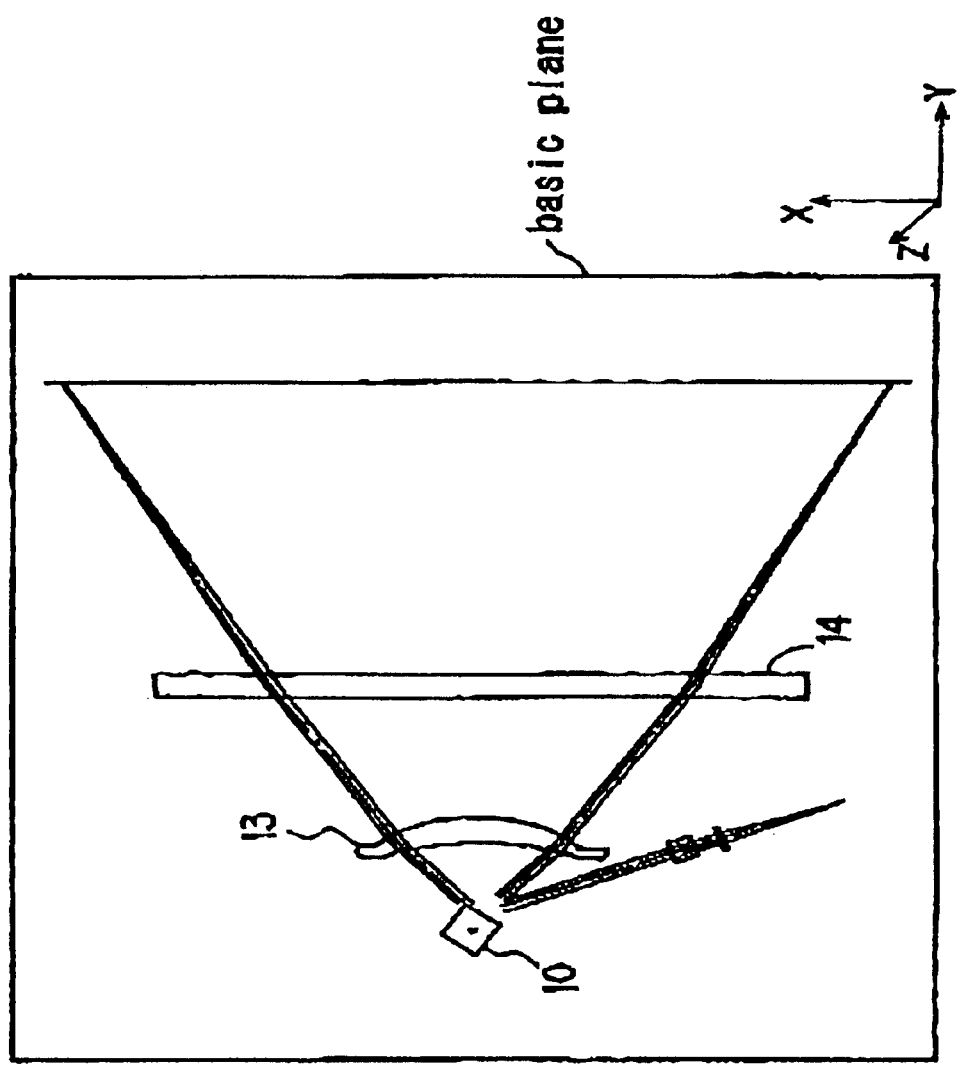
FIG. 4 is a view explaining an optical path of a laser beam to a photosensitive drum.
Figure 5:
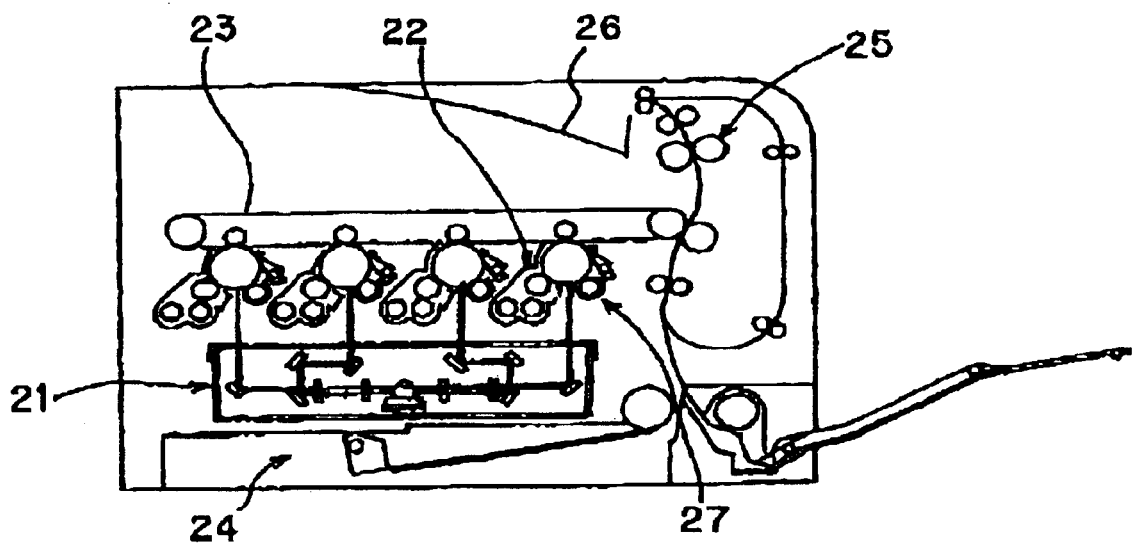
FIG. 5 is a schematic cross sectional view showing an example of an image forming apparatus.
Figure 6:
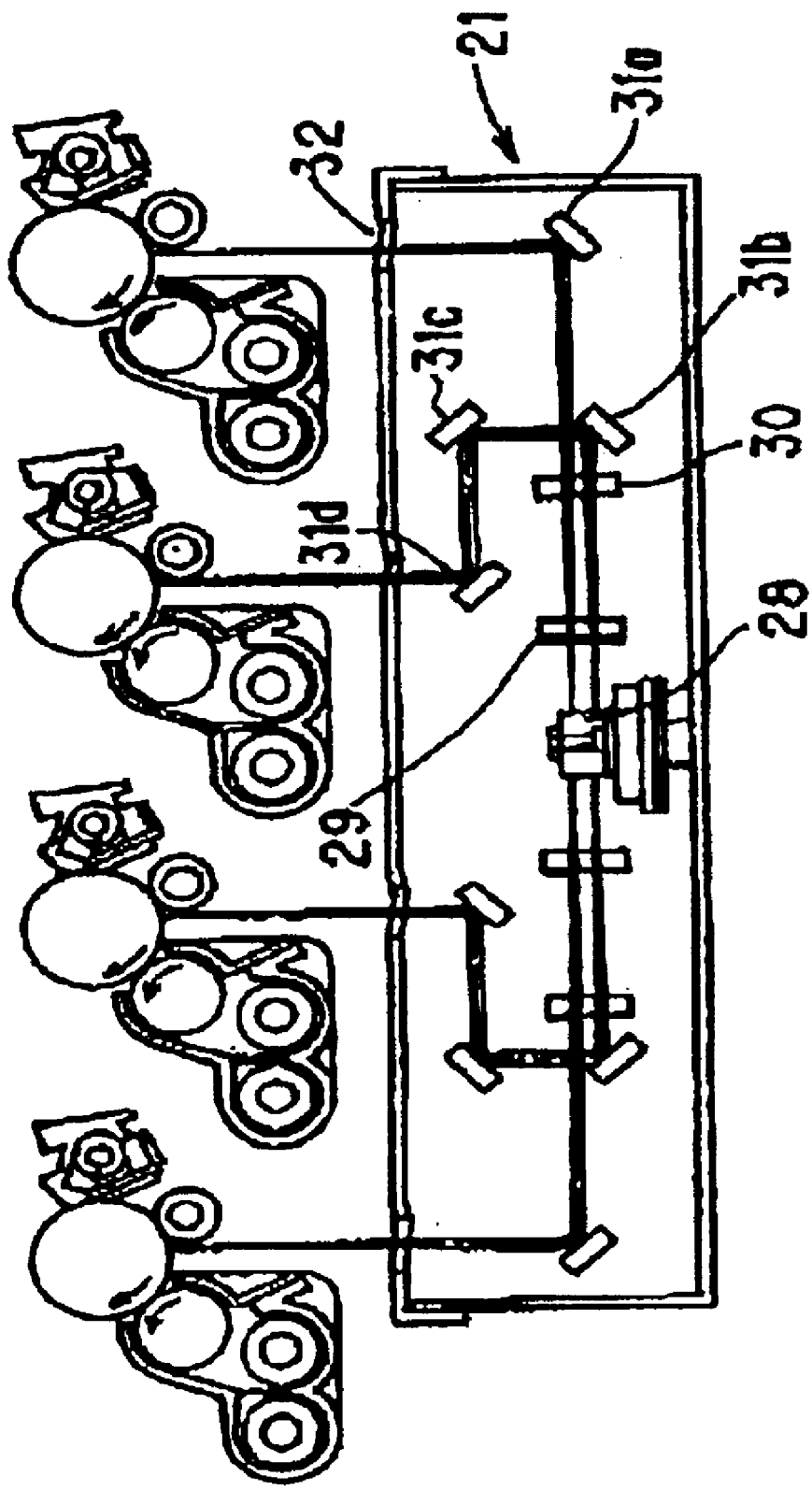
FIG. 6 is a schematic cross sectional view showing a scanning optical unit of the image forming apparatus of FIG. 5.

FIGS. 2 through 4 show a second embodiment of the present invention. FIG. 2 schematically shows a scanning optical unit and an image forming unit such as photosensitive drums, etc., according to the second embodiment of the present invention. The image forming unit in this second embodiment is similar to the one in the first embodiment, and hence an explanation thereof is omitted here.

In the optical arrangement of the scanning optical unit according to this second embodiment, a polygon mirror 10 is arranged in the center of an optical casing, and a plurality of optical paths extending from the polygon mirror 10 to the respective photosensitive drums 1 are arranged in bilateral symmetry, as clearly shown in FIG. 2. Therefore, only two of four scanning groups for beams of irradiation light E1, E2 at one side of the polygon mirror 10 will be explained below.

In addition, the aforementioned first embodiment uses the two-stage polygon mirror 4 of the integral type, but this second embodiment describes such an arrangement that in order to achieve the miniaturization of the scanning optical unit, an oblique incidence optical system uses a thin (single stage) polygon mirror with a plurality of second fθ lenses (second imaging lenses) being arranged for laser beams, respectively, after separation thereof.

Moreover, in the oblique incidence optical system of the second embodiment, to separate upper and lower optical paths from each other after projection of laser beams from the polygon mirror 10, the laser beams are made to enter the polygon mirror 10 at equal but mutually opposite angles relative to a basic plane (an X–Y plane in FIG. 4) which is defined by a normal line of each facet of the polygon mirror 10 and the rotational direction thereof, as shown in FIG. 3A.

In general, it is assumed to be preferable in view of image performance that a relative angle between the basic plane and each deflection scanning light beam is not greater than 3°, and hence the following description will be made based on this assumption.

In the second embodiment, the oblique incidence angles (i.e., the incidence angles of the laser beams entering the polygon mirror 10) are made mutually opposite relative to the basic plane but equal to each other, in order to provide uniform optical characteristics of the laser beams scanned by the polygon mirror 10.

Here, note that the reflection positions of the incident laser beams on each of the deflection facets of the polygon mirror 10 may be the same, as shown in FIG. 3A, or may be displaced or shifted with respect to each other in a height-wise direction of the deflection facets of the polygon mirror 10, as shown in FIG. 3B. By displacing the reflection positions of the incident laser beams on the polygon mirror 10 from each other as shown in FIG. 3B, it is possible to arrange the position of a return mirror 12b at a location nearer to the polygon mirror 10 than in the case of FIG. 3A.

Two laser beams deflection scanned or projected from the polygon mirror 10 pass through a first fθ lens 13, and one of the laser beams lying near the photosensitive drum side is then reflected in a downward direction by means of the return mirror 12b.

Here, it is to be noted that since the laser beams enter the first fθ lens 13 at mutually different angles, the first fθ lens 13 is composed of a cylindrical lens, whereas the laser beams projected from the polygon mirror 10 are respectively imaged or focused on the corresponding photosensitive drums in the sub-scanning direction by means of second fθ lenses 14, which are arranged in the corresponding optical paths, respectively.

The one laser beam downwardly reflected by the return mirror 12b runs in a downward direction while crossing the other laser beam, and then, after passing through a second fθ lens 14 arranged in its optical path, the one laser beam is reflected again by a return mirror 12c arranged on the lower or bottom surface of the optical casing, so that it is irradiated onto a corresponding inner photosensitive drum while passing near one side of the first fθ lens 13.

Here, the other laser beam, which is projected from the polygon mirror 10 and irradiated on a corresponding photosensitive drum disposed at an outer side while passing through an optical path portion lying away from the photosensitive drums, proceeds right under the return mirror 12b to further pass through a second fθ lens 14 disposed in an optical path portion between the polygon mirror 10 and an outer return mirror 12a, whereafter it is then reflected by the outer return mirror 12a so as to be irradiated on the corresponding outer photosensitive drum.

Incidentally, it is to be noted that the return mirrors 12a–12c are arranged in such positions in which the two vertically separated beams are not subjected to vignetting of their luminous fluxes due to the tolerances of individual component parts, the face inclination (i.e., optical face angle error) of the polygon mirror 10 or the like.

Moreover, in the case of an optical system in which the length of each optical path is longer than that of the second embodiment, it may be constructed such that similar to the case where an inner photosensitive drum disposed at the center side is irradiated, two return mirrors are arranged in an optical path for irradiating an outer photosensitive drum, in such a manner that an irradiation light beam E1 reflected by the return mirrors crosses its own laser beam which has been deflection scanned by the polygon mirror 10. In that case, a second fθ lens 14 may be arranged not in an optical path portion extending from the polygon mirror 10 to a first return mirror, but in an optical path portion extending from the first, return mirror to a second return mirror.

Also, regarding the optical arrangement position of the second fθ lens 14, it is possible to arrange the second fθ lens 14 in that portion of the optical path which lies after the return mirror 12c. However, considering that the irradiation position of the laser beam E2 on the inner photosensitive drum is adjusted by the return mirror 12c, there is a possibility that the incidence position of the laser beam entering the second fθ lens 14 may be varied, thus causing a change in the optical performance of the scanning optical unit, too.

Therefore, in such An arrangement, by disposing the second fθ lens 14 in an optical path portion between the return mirror 12b and the position-adjusting return mirror 12c, it is possible to prevent such a change in the optical performance as well as to reduce the size of the apparatus as a whole.

Figure 7:
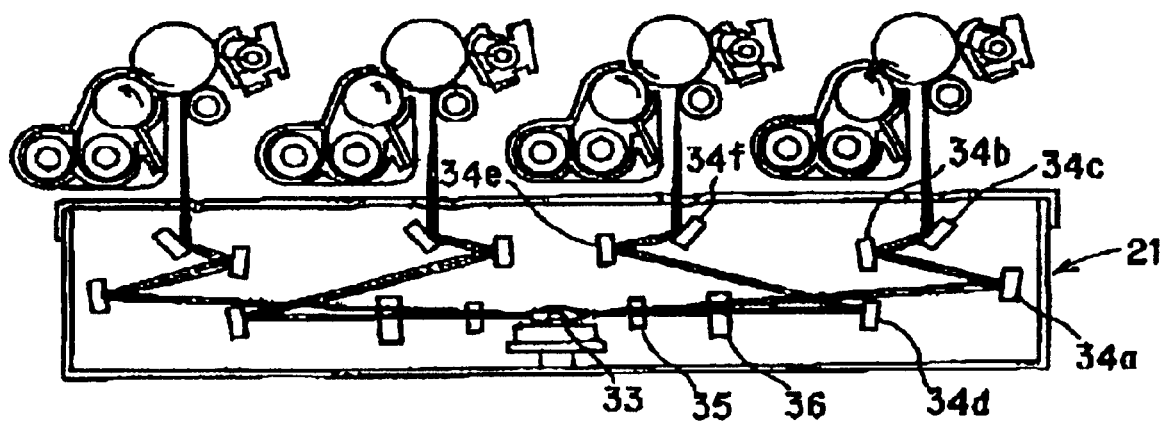
FIG. 7 is a schematic cross sectional view showing another example of a scanning optical unit.

The aforementioned optical system shown in FIG. 7 is disadvantageous from the viewpoint of compactness since all the laser beams are reflected in the direction of the photosensitive drums. In contrast to this, according to the second embodiment of the present invention, it is possible to make the optical system compact by constructing it in such a manner that a laser beam lying near the photosensitive drum side is reflected downwardly, i.e., in a direction away from the photosensitive drums, and then reflected toward a corresponding photosensitive drum by the return mirror 12c so as to cross a plurality of laser beams which have just been projected from the polygon mirror 10.

In addition, by arranging a second fθ lens 14 between the return mirrors 12b, 12c, it is also possible to reduce the longitudinal length of the return mirror 12b as well as to effectively utilize the space therebetween for arrangement of the second fθ lens 14, whereby the scanning optical unit can be made compact and slim in thickness.

In the first and second embodiments, the optical paths for laser beams between the polygon mirror and the photosensitive drums, respectively, are made equal in length to each other, and in addition, it is clear that in cases where a plurality of laser beams are emitted from a source of light in the form of a single laser diode chip, the construction and arrangement of the scanning optical device and hence the image forming apparatus as described above need not be changed, still providing the same advantageous effects.

As described in the foregoing, according to the present invention, the scanning optical unit can be made compact by guiding a laser beam lying near a photosensitive member side in such a manner that it is reflected in a direction away from the photosensitive members so as to cross another laser beam and is then irradiated onto the photosensitive members.

Moreover, by arranging an imaging element such as an fθ lens in an optical path from a first reflection member such as a first return mirror to a second reflection member such as a second return mirror, the space between the first and second reflection members can be effectively utilized, and hence the scanning optical unit can be made compact.

While a few preferred embodiments of the present invention have been described and shown in the foregoing, the present invention is not limited to these embodiments but any modifications or changes can be made therein within the technological concept of the present invention.

What is claimed is:

1. An image forming apparatus comprising:
   a first laser beam and a second laser beam;
   a deflection unit for deflection scanning the first and second laser beams;
   a first photosensitive member being exposed by a first laser beam deflection scanned by said deflection unit;
   a second photosensitive member being disposed at a location more distant from said deflection unit than said first photosensitive member, said second photosensitive member being exposed by a second laser beam deflection scanned by said deflection unit;
   a first reflection member for reflecting the first laser beam deflection scanned by said deflection unit in a direction away from said first photosensitive member; and
   a second reflection member for reflecting the first laser beam reflected by said first reflection member in a direction toward said first photosensitive member,
   wherein the second reflection member is disposed at a position more distant from said first photosensitive member than a path of the second laser beam deflection scanned by said deflection unit;
   wherein said first reflection member is disposed at a position between the second laser beam deflection scanned by said deflection unit and said first photosensitive member.

2. The image forming apparatus according to claim 1, further comprising a third reflection member for reflecting the second laser beam deflection scanned by said deflection unit in a direction toward said second photosensitive member.

3. The image forming apparatus according to claim 1, wherein optical paths for the first and second laser beams deflection scanned by said deflection unit extending toward said first and second photosensitive members, respectively, are of equal length.

4. The image forming apparatus according to claim 1, wherein said first and second photosensitive members are disposed at a same side with respect to said deflection unit, said apparatus further comprising a third photosensitive member and a fourth photosensitive member disposed at a side opposite to said first and second photosensitive members.

5. The image forming apparatus according to claim 4, wherein said deflection unit deflection scans a third laser beam exposing said third photosensitive member and a fourth laser beam exposing said fourth photosensitive member.

6. The image forming apparatus according to claim 5, wherein said third photosensitive member is disposed at a position nearer to said deflection unit than a position of said fourth photosensitive member, said apparatus further comprising:
   a fourth reflection member and a fifth reflection member for reflecting the third laser beam deflection scanned said deflection unit; and
   a sixth reflection member for reflecting the fourth laser beam deflection scanned said reflection by said deflection unit in a direction toward said fourth photosensitive member.

7. The image forming apparatus according to claim 6, wherein said fourth reflection member is disposed at a position nearer to said third photosensitive member than a path of the fourth laser beam deflection scanned said deflection unit, and said fifth reflection member is disposed at a position more remote from said third photosensitive member than a path of the fourth laser beam deflection scanned by said deflection unit.

8. The image forming apparatus according to claim 7, wherein optical paths for the first through fourth laser beams extending from said deflection unit to said first through fourth photosensitive members, respectively, are of equal length.

9. The image forming apparatus according to claim 1, wherein an angle of a first laser beam incident on said deflection unit is different from an angle of a second laser beam incident on said deflection unit.

* * * * *

UNITED STATES PATENT AND TRADEMARK OFFICE
CERTIFICATE OF CORRECTION

PATENT NO.    : 6,801,239 B2
DATED         : October 5, 2004
INVENTOR(S)   : Hiroshi Nakahata It is certified that error appears in the above-identified patent and that said Letters Patent is hereby corrected as shown below:

Column 5,
Line 52, "a" should read -- 8 --.

Column 8,
Line 43, "An" should read -- an --.

Column 10,
Lines 31 and 40, "said" should read -- by said --;
Line 33, "said reflection" should be deleted.

Signed and Sealed this

Twelfth Day of July, 2005

JON W. DUDAS
*Director of the United States Patent and Trademark Office*